United States Patent [19]

White

[11] 4,327,146
[45] Apr. 27, 1982

[54] HIGH DENSITY INTERFACE GYPSUM BOARD AND METHOD FOR MAKING SAME

[75] Inventor: George H. White, North Tonawanda, N.Y.

[73] Assignee: National Gypsum Company, Dallas, Tex.

[21] Appl. No.: 201,216

[22] Filed: Oct. 27, 1980

[51] Int. Cl.³ .............. B32B 5/14; B32B 5/20; B32B 13/08; B32B 31/12

[52] U.S. Cl. .................. 428/308.8; 156/43; 156/44; 156/78; 428/70; 428/703; 428/305.5; 428/316.6; 428/312.4

[58] Field of Search .......... 428/310, 314, 703, 318, 428/319, 446, 70, 212, 305; 156/39, 44, 45, 43

[56] References Cited

U.S. PATENT DOCUMENTS

| | | | |
|---|---|---|---|
| 1,511,500 | 10/1924 | Brookley | 428/314 |
| 3,307,987 | 3/1967 | Bieri | 156/41 |
| 3,389,042 | 6/1968 | Bieri et al. | 161/41 |
| 3,481,829 | 12/1969 | Shull et al. | 162/164 |
| 3,516,882 | 6/1970 | Cummisford | 156/39 |
| 4,009,062 | 2/1977 | Long | 156/39 |
| 4,051,291 | 9/1977 | Long | 428/201 |
| 4,117,183 | 9/1978 | Long | 428/201 |
| 4,119,752 | 10/1978 | Long | 428/198 |
| 4,195,109 | 3/1980 | Long | 428/198 |

Primary Examiner—William J. Van Balen
Attorney, Agent, or Firm—Robert F. Hause

[57] ABSTRACT

A gypsum wallboard, and the method of manufacture, wherein a defoamer is disposed at the gypsum-paper interface during manufacture, causing the foam, present in the core forming gypsum slurry, to break down at the gypsum-paper interface, increasing substantially the density of the gypsum at the interface, relative to the density throughout the center portion of the gypsum core.

7 Claims, 2 Drawing Figures

HIGH DENSITY INTERFACE GYPSUM BOARD AND METHOD FOR MAKING SAME

This invention relates to an improved gypsum wallboard and to an improved method of making gypsum wallboard, and particularly to forming a highly densified layer of gypsum adjacent the gypsum paper interface in a gypsum board.

In the manufacture of paper-covered gypsum board, a substantial amount of liquid foam is intermixed with the settable composition forming the gypsum core, which foam, in the form of very fine bubbles, replaces an equivalent volume of the more expensive components of the core, and results in producing a lighter, easier to handle gypsum board.

It has been common practice to include in the gypsum composition a minor portion of starch, of a nature which will migrate in large part to the gypsum-paper interface, as the excess water in the core migrates toward the surface, during drying of the hardened gypsum board. The starch, which is a relatively expensive component of the gypsum board, is provided for the purpose of insuring a satisfactory bond of the paper to the gypsum core, in the finished gypsum board.

The present invention contemplates the novel step of reducing markedly the amount of foam present in the gypsum slurry disposed immediately adjacent the paper, without reducing the amount of foam in the other portions of slurry, preferably by disposing a defoaming agent on the paper surface prior to forming the gypsum board. By increasing the density of the gypsum located immediately adjacent the paper surface, a low density gypsum board is produced with little or no starch, which, nevertheless, has a satisfactory paper-gypsum bond.

It is an object of the present invention to provide an improved gypsum board at a savings in cost.

It is a further object to provide a method of making gypsum board wherein a thin dense layer of gypsum is formed at the gypsum-paper interface.

It is a further object to provide a method of breaking down the foam in the aqueous gypsum slurry, in a thin zone adjacent the paper, in the manufacture of lightweight gypsum board.

These and other objects and advantages of the invention will be more readily apparent when considered in relation to the preferred embodiments as set forth in the specification and shown in the drawings in which.

Figure 1:
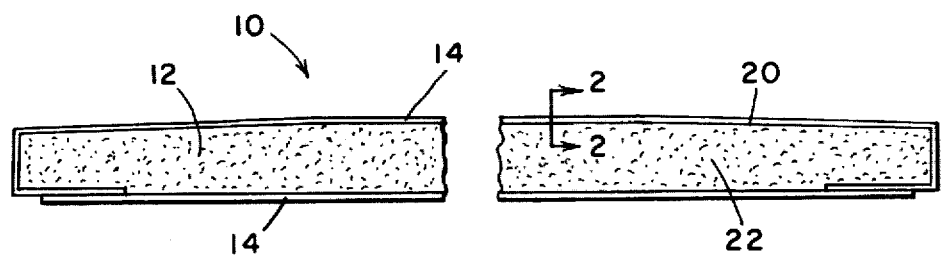
FIG. 1 is an end view of a paper-covered gypsum wallboard, embodying the present invention.

Referring to the drawings, there is shown a paper-covered gypsum board 10, consisting essentially of a set gypsum core 12 and paper cover sheets 14. The gypsum core is of a relatively low density by reason of the presence of a vast number of hollow cells 16, preferably of very minute size, uniformly dispersed throughout all of the core 12 except at a thin surface portion 18 disposed at the interface 20 of the core 12 and paper 14. The thin surface portion 18 of core 12 is of a substantially higher density than the central portion 22 of core 12.

The set gypsum core 12 is bonded to paper cover sheets 14 by a vast number of gypsum crystals 24 which extend into, or are completely disposed within, the interstices 26 between fibers 28 of paper 14 in a condition resulting from having been produced and grown at or within the surface portion 30 of the paper 14.

Figure 2:
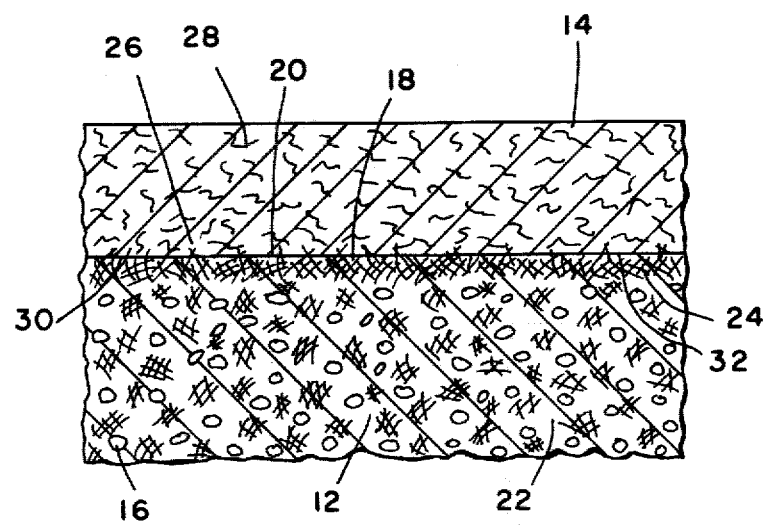
FIG. 2 is an enlarged sectional view of the wallboard of FIG. 1, taken along lines 2—2.

While the drawing of FIG. 2 is diagrammatic, and not intended to be to accurate scale, it is therein depicted how gypsum crystals 24 are present in greater density at the thin surface portion 18 than in the core central portion 22, and how the gypsum crystals 24 extend into the paper surface portion 30, some being wholly within the paper interstices 26.

Unable to be depicted by the drawing is the absence of the usual starch material, or at least the relatively lower quantity of starch material present than would normally be required if the core were entirely of the lower density of the central portion 22. The higher density of the thin surface portion 18 produces a very great increase in the amount of gypsum crystals 24, and in the tightness or proximity of the numerous crystals 24, which results in greatly increasing the ability of the gypsum to perform the bonding of the paper 14 to the core 12, lessening or eliminating the need for the usual addition of starch to the core formulation during manufacture.

The preferred form of manufacturing gypsum board 10 may employ all of the usual gypsum board manufacturing equipment and process steps, plus the additional step of adding a defoaming agent as a surface coating on the inner face 32 of paper 14 prior to the disposing of any settable gypsum in contact with the paper 14.

Preferably, the defoaming agent is applied as a dilute solution or dispersion to the paper inner face 32, during the final processing steps in the paper manufacturing plant. The defoaming agent may be any of many available defoaming agents and possibly any of all of the available defoaming agents. Defoaming agents are usually oil-based or oil-like substances. They vary, one from another, in their cost and in their deforming efficiency.

A preferable defoamer is Hercules Defoamer 344, a non-ionic solution of organic materials in a hydrocarbon oil base having a clear straw-colored appearance, being of medium viscosity and weighing 7.3 lbs/gal., manufactured by Hercules Chemical Co.

Other suitable defoamers are Nopco 9201-A, a trademark of Diamond Shamrock Corp. for a hazy amber blend of mineral oil and non-ionic surfactants; Foamkill S-639, a trademark of Crucible Chemical Co., for hydrophobic silica dispersed in aliphatic hydrocarbons; Foamburst 316, a trademark of Ross Chemical for a petroleum oil and surface active chemical; Mazola corn oil and possibly many others such as those discussed in Chapter 15 of Reinhold Publishing Corporation's text on "Foams: Theory and Industrial Applications", by Bikerman, published in 1953.

The paper manufactured with a surface coating of defoamer on inner face 32 is then moved or shipped to the gypsum board manufacturing plant, whereat the paper is used in the manufacture of paper-covered gypsum board 10. The manufacturing process is otherwise similar to prior processes of forming gypsum board.

To obtain the maximum benefits of the invention, the use of a separate and for gypsum to paper bonding properties, such as the commonly used starch, is eliminated or greatly reduced in the formulation of the aqueous slurry used to form the gypsum board core.

Several one foot square laboratory board samples of gypsum board have been made in accordance with the invention and compared to prior art control samples. The lab samples are made by forming an envelope of paper open only at the top into which a settable gypsum slurry is poured, and the resultant full envelope is supported between a pair of plates spaced ½" apart while the gypsum sets.

In the control sample, regular uncoated paper is used, and a standard foamed settable gypsum aqueous slurry was used, with an amount of starch in the slurry equivalent to a nominal 10 lbs of starch per thousand square feet of ½" gypsum board. Sufficient foam was included in the slurry to produce, on a thousand square foot basis, 1760# ½ inch board, when set and dried.

In evaluating the invention, several lab samples were made, using for the paper envelope, a 25½"×13 ½" paper, of which a 12 9/16"×13½" half of the paper had its inner surface coated with defoamer and the other half did not. The 12"×12" gypsum board lab sample made from this envelope thus provided a direct comparison of treated and untreated papers with a single aqueous core slurry. The core slurry included only that amount of starch which is present in the set accelerator used. The set accelerator used in the core formulation is described in U.S. Pat. No. 3,870,538. These lab samples had an effective amount of starch equivalent to using 2 lbs of starch per thousand square feet of ½" gypsum board.

The several papers, to which defoamer was applied to one half, were coated respectively with Hercules Defoamer 344 and Foamburst 316. Each was diluted with water to form 10% solutions, The Hercules 344 was also tested as a 5% solution, and the Foamburst 316 was also tested as a 20% solution. The 12 9/16×13½" half sheets were coated with 8 grams of solution, or at a rate of 6.7 gm solution/sq. ft. This equates to a rate of 1.4 lbs. defoamer/M sq. ft. of paper, at 10% solution, 0.7 lb. defoamer/M sq. ft. of paper at 5% solution, and 2.8 lbs. defoamer/M sq. ft. of paper, at 20% solution.

After each 12"×12" lab board was made, it was cut in half along the machine direction of the paper. One 6"×12" piece was subjected to 90% Relative Humidity, 90° Fahrenheit for 2 hours and the other 6"×12" piece for 20 hours. Following the humidification, each piece was slit half way through on each side, across the machine direction, 4" from one end on one side and 4" from the other end on the other side. The core is then broken completely through at each cut, and the end sections of core are pulled off the paper adjacent each cut, in such a way that the paper either cleanly peels off the core or it delaminates between paper plies. Clean peel indicates a poor core to paper bond. The percentage of the area throughout which there was clean peeling is measured.

Of the two halves of the control sample, the half in the 2-hour test had a trace of clean peel on one side and no clean peel on the other side. The half in the 20-hour test had no clean peel on either side.

Test results of the lab samples, which had defoamer coated on the paper on one side, untreated on the other side, were as follows:

| Defoamer | Percentage Clean Peel | | | |
|---|---|---|---|---|
| | Hercules 344 | | Foamburst 316 | |
| Solution Strength | 5% | 10% | 10% | 20% |
| 2-Hour Treated Side | 0 | 0 | 0-Trace | 0 |
| Test Untreated Side | 100 | 100 | 100 | 100 |
| 20-Hour Treated Side | 0 | 0 | 0-1 | 0 |
| Test Untreated Side | 100 | 100 | 100 | 100 |

The percentage of clean peel on the treated side of all of the lab samples was low enough to be suitable for commercial use.

After running the Foamburst 316 at a 10% solution, it appeared more defoamer might improve the quality. A 20% solution was tried and it did show an improvement. After the Hercules 344 was tried at a 10% solution, it appeared less defoamer might be satisfactory. A 5% solution was tried. Results indicate that an even lower percentage solution will be suitable in accordance with the invention.

It is also contemplated that the invention can be practiced using a core formulation containing no additive such as starch for aiding the paper to core bonding properties. This decrease or elimination of starch additives provides a large cost savings in the manufacture of gypsum board. Not only is the cost of the starch less or eliminated, but also, with less or no starch, the board is easier to dry, saving substantial amounts of fuel or permitting faster production rates.

Also, a more fire-resistant board is expected to be produced by the present invention.

Having completed a detailed disclosure of the preferred embodiments of my invention so that those skilled in the art may practice the same, I contemplate that variations may be made without departing from the essence of the invention or the scope of the appended claims.

I claim:

1. The method of making paper-covered gypsum board comprising the steps of forming an aqueous slurry of settable gypsum containing a substantial quantity of foam into board form having on at least one surface a paper cover sheet and disposing a thin layer of a relatively unfoamed aqueous slurry of settable gypsum at the interface of said foamed gypsum slurry and said paper cover sheet wherein said unfoamed thin layer is formed by the removal of foam from a surface layer of said foamed aqueous slurry.

2. The method of claim 1 wherein said foam is removed by the presence of a defoaming agent at said foamed slurry-paper interface.

3. The method of claim 2 wherein said defoaming agent is disposed on the surface of said paper prior to the forming of said gypsum board.

4. The method of claim 3 wherein said defoaming agent is applied to said paper surface as a mixture of a minor portion of defoaming agent in a major portion of water.

5. The method of claim 4 wherein said defoaming agent is applied to said paper surface at a rate of about one pound per thousand square feet of paper.

6. A paper-covered gypsum board having a gypsum core and at least one paper cover sheet adhered thereto, by the setting reaction characteristics of gypsum crystals, said gypsum core having generally therethroughout a great multiplicity of fine foam cells, and a thin layer of set gypsum at the gypsum core-paper interface which has a substantially higher density than said gypsum core, whereby a greater number of gypsum crystals are disposed in interlocking relationship with the paper, by having been formed while in contact with the paper, within interstices thereof, wherein the starch content of the gypsum core is a minor amount of no more than about 2 lbs. per thousand square feet of board per half inch of thickness.

7. A paper-covered gypsum board having a gypsum core and at least one paper cover sheet adhered thereto, by the setting reaction characteristics of gypsum crystals, said gypsum core having generally therethroughout a great multiplicity of fine foam cells, and a thin layer of set gypsum at the gypsum core-paper interface which has a substantially higher density than said gypsum core, whereby a greater number of gypsum crystals are disposed in interlocking relationship with the paper, by having been formed while in contact with the paper, within interstices thereof, wherein said paper has a coating of a defoaming agent disposed on the surface at said gypsum core-paper interface.

* * * * *